(12) United States Patent
Aizawa (10) Patent No.: US 12,517,527 B2
(45) Date of Patent: Jan. 6, 2026

(54) CONTROL DEVICE, AIRCRAFT, AND CONTROL METHOD

(71) Applicant: HONDA MOTOR CO., LTD., Tokyo (JP)

(72) Inventor: Bon Aizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 25 days.

(21) Appl. No.: 18/617,819

(22) Filed: Mar. 27, 2024

(65) Prior Publication Data

US 2024/0329662 A1 Oct. 3, 2024

(30) Foreign Application Priority Data

Mar. 29, 2023 (JP) .................. 2023-052541

(51) Int. Cl.
| | | |
|---|---|---|
| G05D 1/00 | (2024.01) | |
| B64C 19/02 | (2006.01) | |
| B64C 27/72 | (2006.01) | |
| G05D 1/85 | (2024.01) | |
| G05D 109/25 | (2024.01) | |

(52) U.S. Cl.
CPC .............. G05D 1/854 (2024.01); B64C 19/02 (2013.01); B64C 27/72 (2013.01); *G05D 2109/25* (2024.01)

(58) Field of Classification Search
CPC ..... G05D 1/854; G05D 2109/25; B64C 19/02; B64C 27/72
USPC ............................................................ 701/3
See application file for complete search history.

(56) References Cited

U.S. PATENT DOCUMENTS

| 11,034,441 B2 | 6/2021 | Mahboubi et al. |
| 2009/0269199 A1* | 10/2009 | Rudley .................. B64C 27/72 416/155 |
| 2017/0320567 A1* | 11/2017 | Miller ................... B64C 27/635 |
| 2018/0244380 A1* | 8/2018 | Sonneborn ............. B64C 27/57 |
| 2019/0023382 A1* | 1/2019 | Welsh ..................... B64C 27/10 |
| 2019/0256199 A1* | 8/2019 | Johnston ............... F16H 57/028 |
| 2020/0031461 A1* | 1/2020 | Mahboubi ............ G05D 1/0808 |
| 2022/0411089 A1* | 12/2022 | Moy ...................... G05D 1/854 |

\* cited by examiner

*Primary Examiner* — Mahmoud S Ismail
(74) *Attorney, Agent, or Firm* — Rankin, Hill & Clark LLP (57) ABSTRACT

When any one of a plurality of first rotors (VTOL rotors) fails, a rotor controller (a VTOL rotor controller) executes thrust increase control for increasing the thrust generated by an adjacent first rotor that is the first rotor adjacent to the failed first rotor, without making the adjacent first rotor cause the thrust variation for vibration suppression control, and executes the vibration suppression control in a manner so that one or more second rotors (VTOL rotors) bear the burden of the thrust variation that has been borne by the adjacent first rotor.

7 Claims, 8 Drawing Sheets

CONTROL DEVICE, AIRCRAFT, AND CONTROL METHOD

CROSS-REFERENCE TO RELATED APPLICATIONS

This application is based upon and claims the benefit of priority from Japanese Patent Application No. 2023-052541 filed on Mar. 29, 2023, the contents of which are incorporated herein by reference.

BACKGROUND OF THE INVENTION

Field of the Invention

The present invention relates to a control device, an aircraft, and a control method.

Description of the Related Art

U.S. Pat. No. 11,034,441 B2 discloses a VTOL aircraft. The VTOL aircraft includes a plurality of actuators (lift fans) that generate vertical thrust (lift thrust). According to the technique of U.S. Pat. No. 11,034,441 B2, an optimal combination of parameters (for example, the position, the rotational speed, or the like) related to the control of the actuators is determined.

SUMMARY OF THE INVENTION

There has been a demand for a control device that can more satisfactorily control the lift thrust of an aircraft.

An object of the present invention is to solve the above-mentioned problem.

According to a first aspect of the present invention, there is provided a control device that controls an aircraft including a plurality of rotors configured to generate vertical thrust, wherein the plurality of rotors include a plurality of first rotors disposed on one side of an imaginary line extending in a longitudinal direction of a fuselage or a width direction of the fuselage, and a plurality of second rotors disposed on another side of the imaginary line, and the control device comprises a rotor controller configured to control the thrust generated by each of the plurality of rotors, and wherein the rotor controller is configured to execute vibration suppression control for suppressing vibration of the aircraft by making one or more of the rotors cause thrust variation for varying the thrust at a frequency equal to or higher than a predetermined frequency, and when any one of the plurality of first rotors fails, the rotor controller executes thrust increase control for increasing the thrust generated by an adjacent first rotor that is one of the first rotors and is adjacent to the first rotor that has failed, without making the adjacent first rotor cause the thrust variation for the vibration suppression control, and executes the vibration suppression control in a manner so that one or more of the second rotors bear a burden of the thrust variation that has been borne by the adjacent first rotor.

According to a second aspect of the present invention, there is provided an aircraft comprising the above-described control device.

According to a third aspect of the present invention, there is provided a control method for controlling an aircraft including a plurality of rotors configured to generate vertical thrust, wherein the plurality of rotors include a plurality of first rotors disposed on one side of an imaginary line extending in a longitudinal direction of a fuselage or a width direction of the fuselage, and a plurality of second rotors disposed on another side of the imaginary line, and the control method comprises a control step in which a rotor controller controls the thrust generated by each of the plurality of rotors, and wherein, in the control step, vibration suppression control for suppressing vibration of the aircraft is executable by making one or more of the rotors cause thrust variation for varying the thrust at a frequency equal to or higher than a predetermined frequency, and in the control step, when any one of the plurality of first rotors fails, thrust increase control for increasing the thrust generated by an adjacent first rotor that is one of the first rotors and is adjacent to the first rotor that has failed is executed without making the adjacent first rotor cause the thrust variation for the vibration suppression control, and the vibration suppression control is executed in a manner so that one or more of the second rotors bear a burden of the thrust variation that has been borne by the adjacent first rotor.

According to the present invention, it is possible to more satisfactorily control the lift thrust of the aircraft.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Embodiment

Hereinafter, a control device, an aircraft, and a control method according to an embodiment will be described.

[Configuration of Aircraft]

Figure 1:
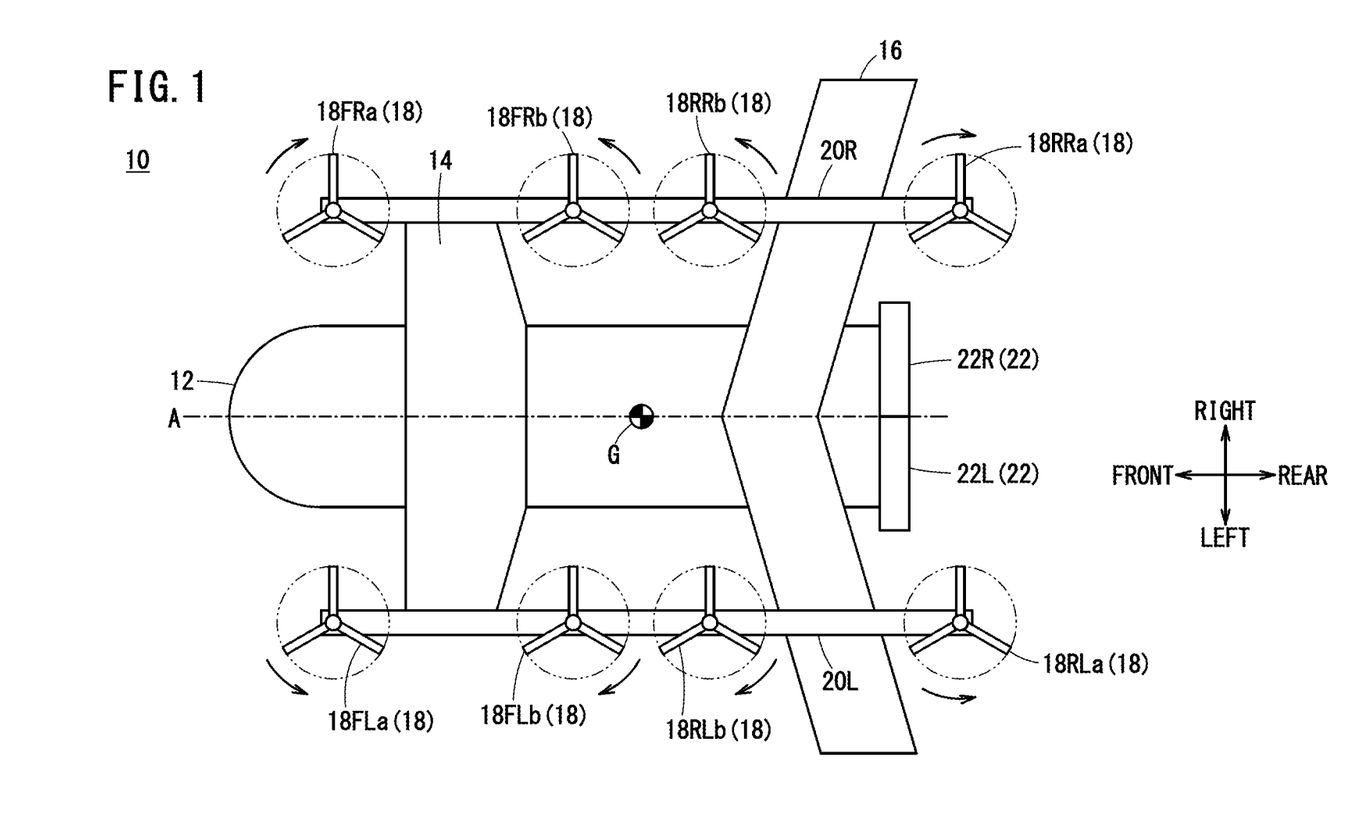
FIG. 1 is a schematic view of an aircraft.
Figure 2:
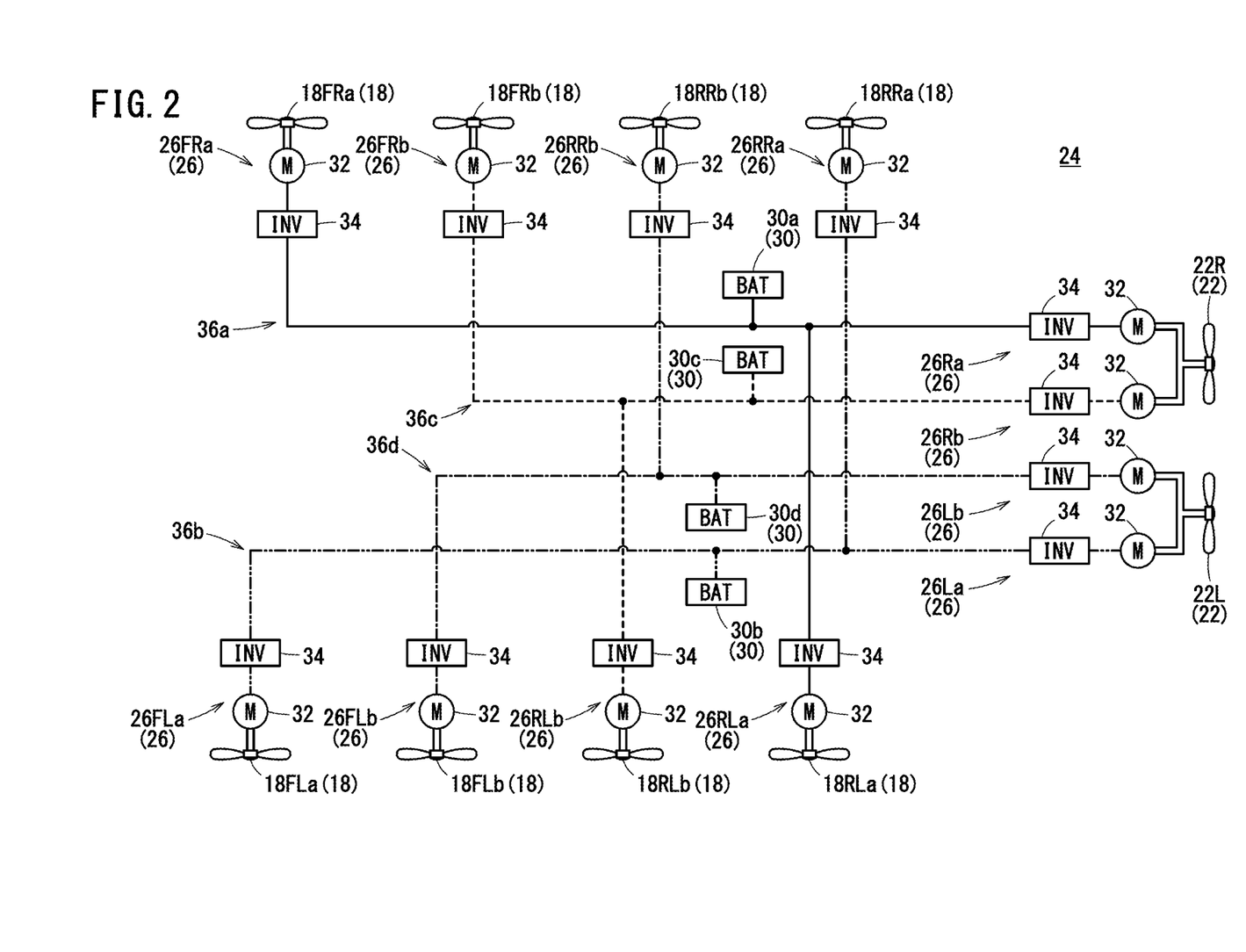
FIG. 2 is a diagram showing a configuration of a power supply system.
Figure 3:
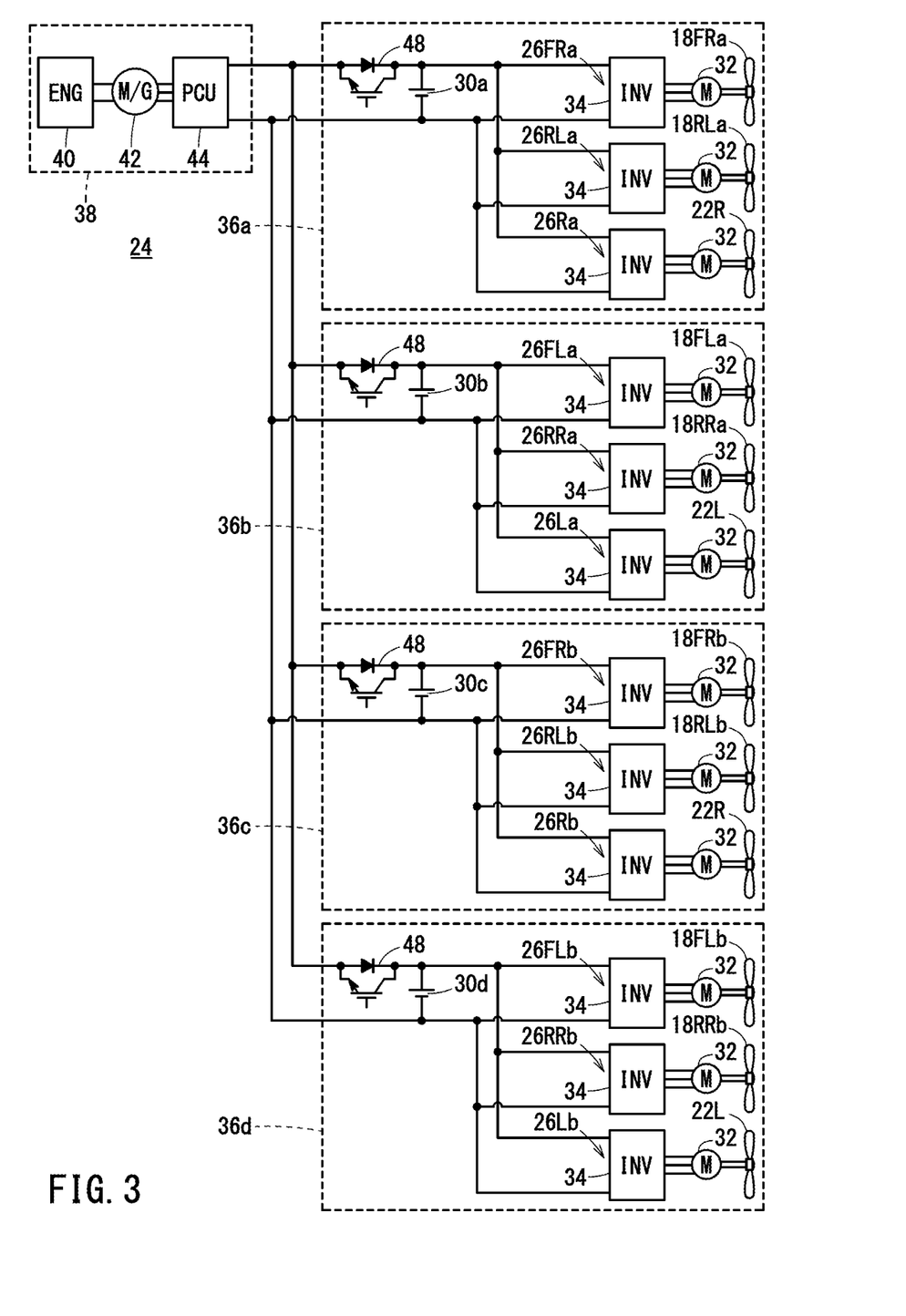
FIG. 3 is a diagram showing the configuration of the power supply system.

FIG. 1 is a schematic view of an aircraft 10. The aircraft 10 of the present embodiment is an electric vertical take-off and landing aircraft (eVTOL aircraft). In the aircraft 10 of the present embodiment, rotors are driven by electric motors 32. The aircraft 10 of the present embodiment generates vertical thrust and horizontal thrust using the rotors. Further, the aircraft 10 of the present embodiment is a hybrid aircraft. The aircraft 10 of the present embodiment includes a motor generator 42 (FIG. 3) and a battery 30 (FIG. 2) as power sources of the electric motor 32 (FIGS. 2 and 3).

The aircraft 10 includes a fuselage 12. The fuselage 12 is provided with a cockpit, a cabin, and the like. A pilot rides in the cockpit and controls the aircraft 10. Passengers and the like ride in the cabin. The aircraft 10 may be automatically controlled without a pilot aboard.

The aircraft 10 includes a front wing 14 and a rear wing 16. The front wing 14 is attached forward of a center of gravity G of the fuselage 12. The rear wing 16 is attached rearward of the center of gravity G of the fuselage 12. When the aircraft 10 moves forward, lift is generated in each of the front wing 14 and the rear wing 16.

The aircraft 10 includes eight VTOL rotors 18. The eight VTOL rotors 18 are a rotor 18FLa, a rotor 18FLb, a rotor 18RLa, a rotor 18RLb, a rotor 18FRa, a rotor 18FRb, a rotor 18RRa, and a rotor 18RRb.

The rotor 18FLa, the rotor 18FLb, the rotor 18RLa, and the rotor 18RLb are attached to a boom 20L. The boom 20L extends in the front-rear direction. The boom 20L is attached to the front wing 14 and the rear wing 16. The boom 20L is provided on the left side of the center of gravity G. That is, the rotor 18FLa, the rotor 18FLb, the rotor 18RLa, and the rotor 18RLb are disposed on the left side of the center of gravity G.

The rotor 18FRa, the rotor 18FRb, the rotor 18RRa, and the rotor 18RRb are attached to a boom 20R. The boom 20R extends in the front-rear direction. The boom 20R is attached to the front wing 14 and the rear wing 16. The boom 20R is provided on the right side of the center of gravity G. That is, the rotor 18FRa, the rotor 18FRb, the rotor 18RRa, and the rotor 18RRb are disposed on the right side of the center of gravity G.

When the aircraft 10 is viewed from above, each of the rotor 18FLa, the rotor 18RLa, the rotor 18FRb, and the rotor 18RRb rotates counterclockwise. When the aircraft 10 is viewed from above, each of the rotor 18FRa, the rotor 18RRa, the rotor 18FLb, and the rotor 18RLb rotates clockwise.

A rotation shaft (not shown) of each of the VTOL rotors 18 extends in the up-down direction. The thrust of each of the VTOL rotors 18 is controlled by appropriately adjusting the rotational speed of the rotor and the pitch angle of the blades. Each of the VTOL rotors 18 is used during vertical take-off, during transition from vertical take-off to cruising, during transition from cruising to vertical landing, during vertical landing, during hovering, and the like. Further, each of the VTOL rotors 18 is used during attitude control. The rotation shaft of each VTOL rotor 18 may be angled (canted) a few degrees with respect to the up-down direction.

By controlling the thrust of each of the eight VTOL rotors 18, lift thrust is generated. The lift thrust refers to vertical thrust. The magnitude of the lift thrust is determined according to the sum of the thrusts of the eight VTOL rotors 18.

By controlling the thrust of each of the eight VTOL rotors 18, a roll moment is applied to the fuselage 12. The magnitude of the roll moment is determined according to the difference between the sum of the thrusts of the four VTOL rotors 18 disposed on the left side of the center of gravity G, and the sum of the thrusts of the four VTOL rotors 18 disposed on the right side of the center of gravity G.

The four VTOL rotors 18 disposed on the left side of the center of gravity G indicate the rotor 18FLa, the rotor 18FLb, the rotor 18RLa, and the rotor 18RLb. The four VTOL rotors 18 disposed on the right side of the center of gravity G indicate the rotor 18FRa, the rotor 18FRb, the rotor 18RRa, and the rotor 18RRb.

By controlling the thrust of each of the eight VTOL rotors 18, a pitch moment is applied to the fuselage 12. The magnitude of the pitch moment is determined according to the difference between the sum of the thrusts of the four VTOL rotors 18 disposed forward of the center of gravity G, and the sum of the thrusts of the four VTOL rotors 18 disposed rearward of the center of gravity G.

The four VTOL rotors 18 disposed forward of the center of gravity G indicate the rotor 18FLa, the rotor 18FLb, the rotor 18FRa, and the rotor 18FRb. The four VTOL rotors 18 disposed rearward of the center of gravity G indicate the rotor 18RLa, the rotor 18RLb, the rotor 18RRa, and the rotor 18RRb.

By controlling the counter torque in each of the eight VTOL rotors 18, a yaw moment is applied to the fuselage 12. The magnitude of the yaw moment is determined according to the difference between the sum of the counter torques of the four VTOL rotors 18 rotating counterclockwise, and the sum of the counter torques of the four VTOL rotors 18 rotating clockwise.

When the rotation shaft of each of the VTOL rotors 18 is angled (canted) a few degrees with respect to the up-down direction, thrust in the lateral direction of the fuselage 12 is generated by the VTOL rotors 18. In this case, the magnitude of the yaw moment is determined according to, in addition to the above-described difference between the sums of the counter torques, the difference between the moment generated by the thrust generated in the counterclockwise direction of the fuselage 12, and the moment generated by the thrust generated in the clockwise direction of the fuselage 12.

The four VTOL rotors 18 rotating counterclockwise indicate the rotor 18FLa, the rotor 18RLa, the rotor 18FRb, and the rotor 18RRb. The four VTOL rotors 18 rotating clockwise indicate the rotor 18FRa, the rotor 18RRa, the rotor 18FLb, and the rotor 18RLb.

The aircraft 10 includes two cruise rotors 22. The two cruise rotors 22 are a rotor 22L and a rotor 22R.

The rotor 22L and the rotor 22R are attached to a rear portion of the fuselage 12. The rotor 22L is disposed on the left side of a center line A extending in the longitudinal direction of the fuselage 12. The rotor 22R is disposed on the right side of the center line A extending in the longitudinal direction of the fuselage 12.

A rotation shaft (not shown) of each of the cruise rotors 22 extends in the front-rear direction. The thrust of each of the cruise rotors 22 is controlled by adjusting the rotational speed of the rotor and the pitch angle of the blades. Each of the cruise rotors 22 is used during transition from vertical take-off to cruising, during cruising, during transition from cruising to vertical landing, and the like. Further, each of the cruise rotors 22 is used during attitude control. The rotation shaft of each of the cruise rotors 22 may be angled (canted) a few degrees with respect to the front-rear direction.

By controlling the thrust of each of the two cruise rotors 22, cruise thrust is generated. The cruise thrust refers to horizontal thrust. The magnitude of the cruise thrust is determined according to the sum of the thrusts of the two cruise rotors 22.

By controlling the thrust of each of the two cruise rotors 22, a yaw moment is applied to the fuselage 12. The magnitude of the yaw moment is determined according to the difference between the magnitude of the thrust of the rotor 22L and the magnitude of the thrust of the rotor 22R.

[Configuration of Power Supply System]

FIG. 2 is a diagram showing the configuration of a power supply system 24. FIG. 2 mainly shows a connection relationship between four batteries 30 and twelve electric motors 32. FIG. 3 is a diagram showing the configuration of the power supply system 24.

One drive unit 26 is provided for each VTOL rotor 18. A drive unit 26FLa is provided for the rotor 18FLa. A drive unit 26FLb is provided for the rotor 18FLb. A drive unit 26RLa is provided for the rotor 18RLa. A drive unit 26RLb is provided for the rotor 18RLb. A drive unit 26FRa is provided for the rotor 18FRa. A drive unit 26FRb is provided for the rotor 18FRb. A drive unit 26RRa is provided for the rotor 18RRa. A drive unit 26RRb is provided for the rotor 18RRb.

Two drive units 26 are provided for each cruise rotor 22. A drive unit 26La and a drive unit 26Lb are provided for the rotor 22L. A drive unit 26Ra and a drive unit 26Rb are provided for the rotor 22R.

One battery 30 is connected to the three drive units 26. A battery 30a is connected to the drive unit 26FRa, the drive unit 26RLa, and the drive unit 26Ra. A battery 30b is connected to the drive unit 26FLa, the drive unit 26RRa, and the drive unit 26La. A battery 30c is connected to the drive unit 26FRb, the drive unit 26RLb, and the drive unit 26Rb. A battery 30d is connected to the drive unit 26FLb, the drive unit 26RRb, and the drive unit 26Lb.

Each drive unit 26 include the electric motor 32 and an inverter 34. The electric motor 32 is a three-phase motor. An output shaft (not shown) of the electric motor 32 is coupled to the rotation shaft of each VTOL rotor 18 or the rotation shaft of each cruise rotor 22. The inverter 34 converts the input DC power into three-phase AC power and outputs the three-phase AC power to the electric motor 32.

As shown in FIG. 3, three drive units 26 and one battery 30 constitute a drive module 36. The drive unit 26FRa, the drive unit 26RLa, the drive unit 26Ra, and the battery 30a constitute a drive module 36a. The drive unit 26FLa, the drive unit 26RRa, the drive unit 26La, and the battery 30b constitute a drive module 36b. The drive unit 26FRb, the drive unit 26RLb, the drive unit 26Rb, and the battery 30c constitute a drive module 36c. The drive unit 26FLb, the drive unit 26RRb, the drive unit 26Lb, and the battery 30d constitute a drive module 36d.

Each drive module 36 is connected to a power generation module 38. The power generation module 38 includes an engine 40, the motor generator 42, and a power control unit (hereinafter referred to as PCU) 44.

The engine 40 is a gas turbine engine. The engine 40 may be a reciprocating engine. The motor generator 42 functions as a three-phase motor and also functions as a three-phase generator. The rotation shaft (not shown) of the motor generator 42 is coupled to the output shaft (not shown) of the engine 40.

The PCU 44 includes an inverter and a converter. The PCU 44 converts the three-phase AC power input from the motor generator 42 into DC power and outputs the DC power. Further, the PCU 44 converts the DC power input from each battery 30 into three-phase AC power and outputs the three-phase AC power to the motor generator 42.

As shown in FIG. 3, each drive module 36 includes a switch 48. Each switch 48 includes a switching element such as an IGBT and a diode. Each switch 48 always allows the supply of electric power from the power generation module 38 to the drive module 36. When each switch 48 is ON, it allows the supply of electric power from the drive module 36 to the power generation module 38.

When each switch 48 is ON, electric power is supplied from each battery 30 to the motor generator 42. As a result, the motor generator 42 is operated to start the engine 40. When the engine 40 is operating, the electric power generated by the motor generator 42 is supplied to each battery 30 and each electric motor 32. As a result, each battery 30 is charged. In addition, each electric motor 32 is operated.

FIGS. 2 and 3 show the outline of the power supply system 24. In the power supply system 24 shown in FIGS. 2 and 3, some members are omitted. The omitted members include, for example, electrical loads other than the electric motors 32, resistors, coils, capacitors, various sensors, fuses, relays, breakers, precharge circuits, DC-DC converters, and the like.

[Configuration of Control Device]

Figure 4:
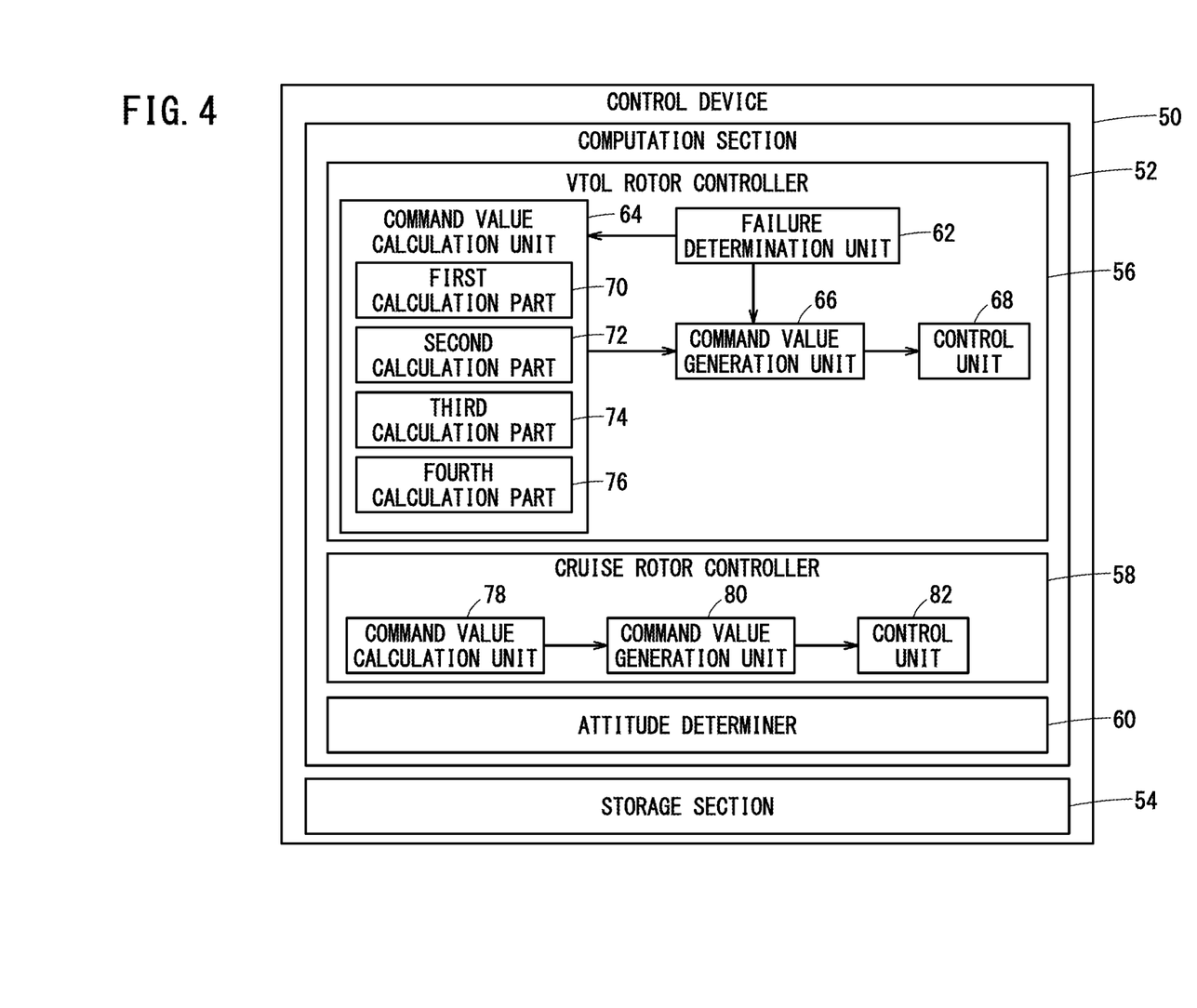
FIG. 4 is a control block diagram of a control device.

FIG. 4 is a control block diagram of a control device 50. The control device 50 controls the thrust of each VTOL rotor 18 and the thrust of each cruise rotor 22. The control device 50 includes a computation section 52 and a storage section 54.

The computation section 52 is, for example, a processor such as a central processing unit (CPU) or a graphics processing unit (GPU). The computation section 52 includes a VTOL rotor controller 56, a cruise rotor controller 58, and an attitude determiner 60. The VTOL rotor controller 56 includes a failure determination unit 62, a command value calculation unit 64, a command value generation unit 66, and a control unit 68. The command value calculation unit 64 includes a first calculation part 70, a second calculation part 72, a third calculation part 74, and a fourth calculation part 76. The cruise rotor controller 58 includes a command value calculation unit 78, a command value generation unit 80, and a control unit 82.

The VTOL rotor controller 56, the cruise rotor controller 58, and the attitude determiner 60 are each realized by the computation section 52 executing a program stored in the storage section 54. At least part of the VTOL rotor controller 56, the cruise rotor controller 58, and the attitude determiner 60 may be realized by an integrated circuit such as an application specific integrated circuit (ASIC) or a field-programmable gate array (FPGA). At least part of the VTOL rotor controller 56, the cruise rotor controller 58, and the attitude determiner 60 may be realized by an electronic circuit including a discrete device.

The storage section 54 is constituted by a volatile memory (not shown) and a non-volatile memory (not shown) which are computer-readable storage media. The volatile memory is, for example, a random access memory (RAM) or the like. The non-volatile memory is, for example, a read only memory (ROM), a flash memory, or the like. Data and the like are stored in, for example, the volatile memory. Programs, tables, maps, and the like are stored in, for example, the non-volatile memory. At least part of the storage section 54 may be included in the processor, the integrated circuit, or the like described above.

The failure determination unit 62 determines whether any one of the eight VTOL rotors 18 has failed. For example, the failure determination unit 62 may monitor a signal of an encoder or the like provided in each VTOL rotor 18 or each electric motor 32. In this case, the failure determination unit 62 can determine whether the VTOL rotor 18 has failed, by comparing the rotational speed indicated by the signal with a rotational speed threshold. Alternatively, the failure determination unit 62 can determine whether the VTOL rotor 18 has failed, by comparing the amount of change in the attitude of the fuselage 12 determined by the attitude determiner 60 with an attitude change threshold. Alternatively, the failure determination unit 62 can determine whether the VTOL rotor 18 has failed, based on the gear ratio of a gear interposed between the VTOL rotor 18 and the electric motor 32, and the rotational speed of the VTOL rotor 18 (or the rotational speed of the electric motor 32). Alternatively, when a communication system related to the control of the VTOL rotor 18 is interrupted, the failure determination unit 62 can determine that the VTOL rotor 18 has failed.

The first calculation part 70 calculates a lift thrust command value. The lift thrust command value is determined in accordance with, for example, the operation amount of an operation input unit performed by the pilot. The operation input unit is, for example, a control stick, a pedal, a lever, or the like. The operation amount of the operation input unit and the lift thrust command value may not have a one-to-one correspondence. The lift thrust command value may be variable with respect to the operation amount of the operation input unit in accordance with the operation range of the operation input unit, the operation speed of the operation input unit, the altitude of the fuselage 12, and the like. The altitude of the fuselage 12 is estimated based on, for example, a distance between the fuselage 12 and the ground detected by a ground distance meter (not shown). The altitude of the fuselage 12 is estimated based on, for example, signals received from a global navigation satellite system (GNSS).

When there is no operation input to the operation input unit by the pilot, the lift thrust command value may be automatically determined and hovering may be performed regardless of the operation amount of the operation input unit. Further, when the aircraft 10 is automatically controlled, the lift thrust command value may be automatically determined in accordance with a preset flight path, regardless of the operation amount of the operation input unit.

The second calculation part 72 calculates a roll moment command value. The roll moment command value is determined in accordance with the operation amount of the operation input unit performed by the pilot. The operation amount of the operation input unit and the roll moment command value may not have a one-to-one correspondence. The roll moment command value may be variable with respect to the operation amount of the operation input unit in accordance with the operation range of the operation input unit, the operation speed of the operation input unit, the angular velocity of the fuselage 12, and the like. The angular velocity of the fuselage 12 is detected by, for example, a gyro sensor (not shown).

When there is no operation input to the operation input unit by the pilot, the roll moment command value may be automatically determined and hovering may be performed regardless of the operation amount of the operation input unit. Further, when the aircraft 10 is automatically controlled, the roll moment command value may be automatically determined in accordance with the preset flight path, regardless of the operation amount of the operation input unit.

The third calculation part 74 calculates a pitch moment command value. The pitch moment command value is determined in accordance with, for example, the operation amount of the operation input unit performed by the pilot. The operation amount of the operation input unit and the pitch moment command value may not have a one-to-one correspondence. The pitch moment command value may be variable with respect to the operation amount of the operation input unit in accordance with the operation range of the operation input unit, the operation speed of the operation input unit, the angular velocity of the fuselage 12, and the like.

When there is no operation input to the operation input unit by the pilot, the pitch moment command value may be automatically determined and hovering may be performed regardless of the operation amount of the operation input unit. Further, when the aircraft 10 is automatically controlled, the pitch moment command value may be automatically determined in accordance with the preset flight path, regardless of the operation amount of the operation input unit.

The fourth calculation part 76 calculates a yaw moment command value. The yaw moment command value is determined in accordance with, for example, the operation amount of the operation input unit performed by the pilot. The operation amount of the operation input unit and the yaw moment command value may not have a one-to-one correspondence. The yaw moment command value may be variable with respect to the operation amount of the operation input unit in accordance with the operation range of the operation input unit, the operation speed of the operation input unit, the angular velocity of the fuselage 12, and the like.

When there is no operation input to the operation input unit by the pilot, the yaw moment command value may be automatically determined and hovering may be performed regardless of the operation amount of the operation input unit. Further, when the aircraft 10 is automatically controlled, the yaw moment command value may be automatically determined in accordance with the preset flight path, regardless of the operation amount of the operation input unit.

The command value generation unit 66 generates a thrust command value for each VTOL rotor 18. The command value generation unit 66 generates the thrust command value based on the lift thrust command value, the roll moment command value, the pitch moment command value, and the yaw moment command value. Further, when any one of the VTOL rotors 18 has failed, the command value generation unit 66 corrects the thrust command value for each VTOL rotor 18 until the attitude of the fuselage 12 is stabilized.

The control unit 68 controls the thrust of each VTOL rotor 18 based on the thrust command value for each VTOL rotor 18.

The command value calculation unit 78 calculates a cruise thrust command value. The cruise thrust command value is determined in accordance with, for example, the operation amount of the operation input unit performed by the pilot. The operation amount of the operation input unit and the cruise thrust command value may not have a one-to-one correspondence. The cruise thrust command value may be variable with respect to the operation amount of the operation input unit in accordance with the operation range of the operation input unit, the operation speed of the operation input unit, the airspeed of the fuselage 12, and the like. The airspeed of the fuselage 12 is detected by, for example, an airspeed sensor (not shown).

When there is no operation input to the operation input unit by the pilot, the cruise thrust command value may be automatically determined and the aircraft 10 may fly at a constant speed. Further, when the aircraft 10 is automatically controlled, the cruise thrust command value may be automatically determined in accordance with the preset flight path, regardless of the operation amount of the operation input unit.

The command value generation unit 80 generates a thrust command value for each cruise rotor 22. The command value generation unit 80 generates the thrust command value based on the cruise thrust command value.

The control unit 82 controls the thrust of each cruise rotor 22 based on the thrust command value for each cruise rotor 22.

The attitude determiner 60 monitors signals from a three-axis acceleration sensor, an orientation sensor, and the like provided in the aircraft 10. The attitude determiner 60 determines the attitude change amount and the attitude of the fuselage 12 based on the signals.

[Vibration Suppression Control]

During flight of the aircraft 10, the fuselage 12 vibrates at a frequency equal to or higher than a predetermined frequency due to disturbance such as wind. In response to this situation, the VTOL rotor controller 56 performs control for suppressing the vibration of the fuselage 12 (vibration suppression control). The VTOL rotor controller 56 makes each VTOL rotor 18 cause thrust variation for varying the thrust at a frequency (the frequency equal to or higher than the predetermined frequency) for canceling the disturbance. The vibration is canceled by varying the thrust of each VTOL rotor 18. Therefore, the vibration of the fuselage 12 is suppressed.

For example, the command value generation unit 66 generates a thrust command value with a thrust variation component for the vibration suppression control added thereto. The control unit 68 can perform the vibration suppression control by varying the rotational speed of the VTOL rotor 18. Further, the control unit 68 can perform the vibration suppression control by varying the pitch of a plurality of blades provided in the VTOL rotor 18. In the present embodiment, the control unit 68 performs the vibration suppression control based on the pitch variation of the blades in preference to the vibration suppression control based on the rotational speed variation of the VTOL rotor 18.

[Control when VTOL Rotor Fails]

In the present embodiment, a plurality of VTOL rotors 18 (first rotors) disposed on one side (one of the left and right sides) of the center line A (an imaginary line) extending in the longitudinal direction of the fuselage 12 belong to one group. Similarly, in the present embodiment, a plurality of VTOL rotors 18 (second rotors) disposed on the other side (the other of the left and right sides) of the center line A (the imaginary line) extending in the longitudinal direction of the fuselage 12 belong to another group. When a failure occurs in any one of the VTOL rotors 18, the VTOL rotor controller 56 selects one or more VTOL rotors 18 from each group, and performs thrust control different from normal thrust control on the selected VTOL rotors 18. The control will be described below.

Figure 5:
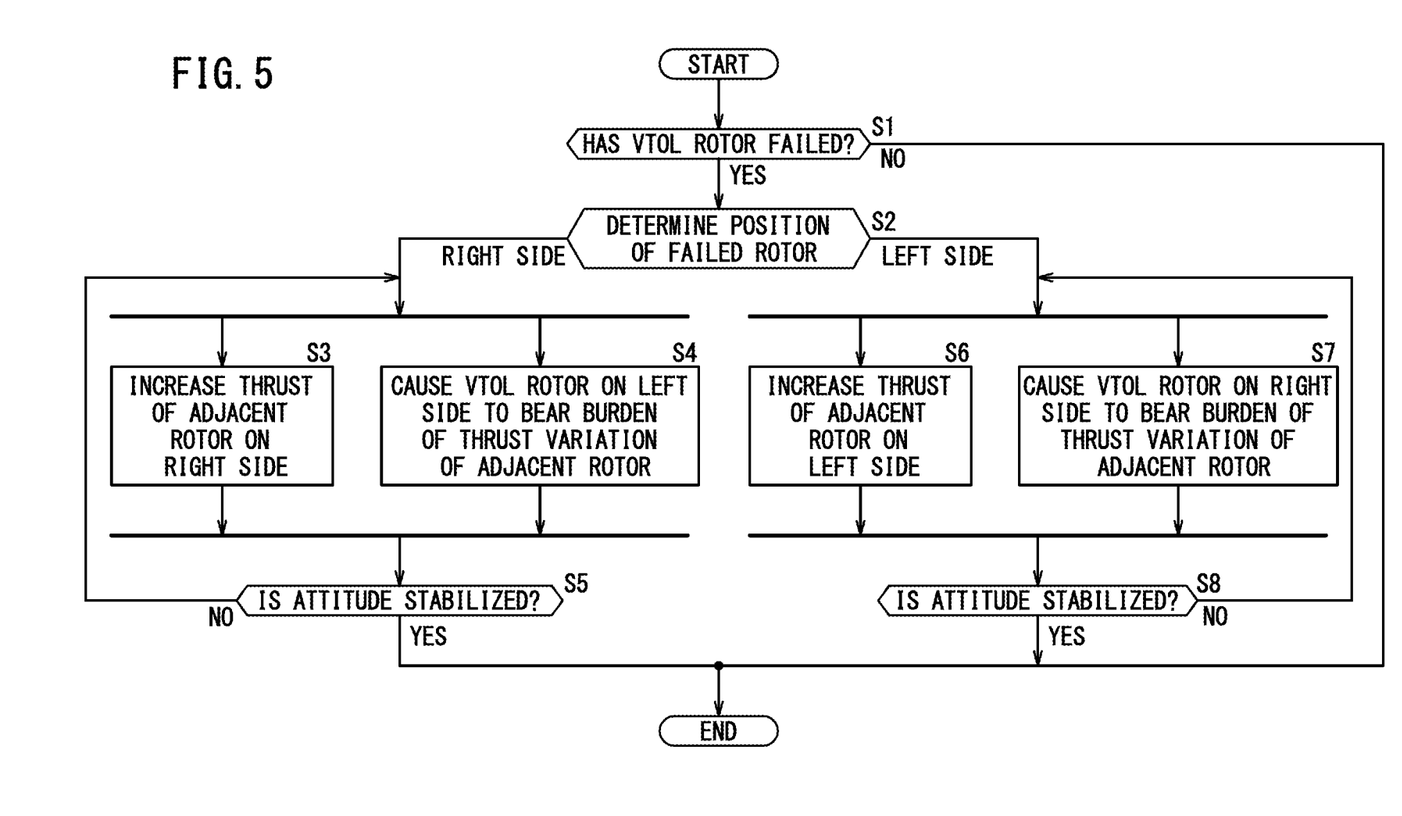
FIG. 5 is a flowchart showing the flow of control according to a present embodiment.

FIG. 5 is a flowchart showing the flow of the control according to the present embodiment. The VTOL rotor controller 56 repeatedly executes the process shown in FIG. 5 at a predetermined cycle during the flight of the aircraft 10. In the following description, the VTOL rotor 18 that has failed is also referred to as a failed rotor 18. Further, the VTOL rotor 18 adjacent to the failed rotor 18 is also referred to as an adjacent rotor 18 (an adjacent first rotor).

In step S1, the failure determination unit 62 determines whether one of the plurality of VTOL rotors 18 has failed. When any one of the VTOL rotors 18 has failed (step S1: YES), the process proceeds to step S2. On the other hand, when none of the VTOL rotors 18 has failed (step S1: NO), the process is ended.

When the process proceeds from step S1 to step S2, the failure determination unit 62 determines the position of the VTOL rotor 18 that has failed. When the VTOL rotor 18 on the right side has failed (step S2: right side), the process proceeds to step S3 and step S4. On the other hand, when the VTOL rotor 18 on the left side has failed (step S2: left side), the process proceeds to step S6 and step S7.

When the process proceeds from step S2 to step S3 and step S4, the control device 50 controls the VTOL rotors 18 on the right side (the first rotors) other than the failed rotor 18, and the VTOL rotors 18 on the left side (the second rotors) to stabilize the attitude of the fuselage 12.

In step S3, the VTOL rotor controller 56 increases the thrust generated by the adjacent rotor 18 among the plurality of VTOL rotors 18 on the right side. As described above, the adjacent rotor 18 is the VTOL rotor 18 adjacent to the failed rotor 18. The control for increasing the thrust generated by the adjacent rotor 18 is referred to as thrust increase control. Immediately after the VTOL rotor 18 has failed, the balance of the lift thrust generated on the fuselage 12 is temporarily lost. The thrust increase control is control for recovering the balance of the lift thrust. For example, the command value generation unit 66 increases the thrust command value for the adjacent rotor 18 so as to be larger than the thrust command value for the adjacent rotor 18 before the VTOL rotor 18 fails. On the other hand, the command value generation unit 66 does not assign the thrust variation component for the vibration suppression control, to the thrust command value for the adjacent rotor 18. That is, the command value generation unit 66 does not make the adjacent rotor 18 cause the thrust variation for the vibration suppression control. The control unit 68 controls the rotational speed of the adjacent rotor 18 or the pitch of the blades of the adjacent rotor 18 based on the generated thrust command value. As a result, the thrust generated by the adjacent rotor 18 increases.

In step S4, the VTOL rotor controller 56 causes the VTOL rotor 18 on the left side to bear the burden of the thrust variation for the vibration suppression control that has been borne by the adjacent rotor 18. For example, the command value generation unit 66 selects, from among the plurality of VTOL rotors 18 on the left side, the VTOL rotor 18 disposed at a position symmetrical to the position of the adjacent rotor 18 with respect to the center of gravity G of the aircraft 10. The command value generation unit 66 assigns, to the thrust command value for the selected VTOL rotor 18, the vibration suppression component that has been assigned to the adjacent rotor 18. That is, the command value generation unit 66 causes the selected VTOL rotor 18 to bear the burden of the thrust variation for the vibration suppression control that has been borne by the adjacent rotor 18.

If the vibration suppression control for varying the thrust at the predetermined frequency or higher is executed on the adjacent rotor 18 that generates large thrust, the power consumption of the electric motor 32 that operates the adjacent rotor 18 further increases. According to the present embodiment, the adjacent rotor 18 does not cause the thrust variation for the vibration suppression control, and therefore, an increase in the power consumption of the electric motor 32 that operates the adjacent rotor 18 can be suppressed.

In step S5, the attitude determiner 60 determines whether the attitude of the fuselage 12 is stabilized. This determination is periodically performed during the execution of step S3 and step S4. When the attitude of the fuselage 12 is stabilized (step S5: YES), the process is ended. After the process is ended, the VTOL rotor controller 56 controls the plurality of VTOL rotors 18 other than the failed rotor 18 in a cooperative manner to stabilize the attitude of the fuselage 12. On the other hand, when the attitude of the fuselage 12 is not stabilized (step S5: NO), the process of step S3 and the process of step S4 are continuously performed.

When the process proceeds from step S2 to step S6 and step S7, the control device 50 controls the VTOL rotors 18 on the left side (the first rotors) other than the failed rotor 18, and the VTOL rotors 18 on the right side (the second rotors) to stabilize the attitude of the fuselage 12.

In step S6, the VTOL rotor controller 56 increases the thrust generated by the adjacent rotor 18 among the plurality of VTOL rotors 18 on the left side. For example, the command value generation unit 66 generates the thrust command value for the adjacent rotor 18 in the same manner as the process of step S3.

In step S7, the VTOL rotor controller 56 causes the VTOL rotors 18 on the right side to bear the burden of the thrust variation for the vibration suppression control that has been borne by the adjacent rotor 18. For example, in the same manner as the process of step S4, the command value generation unit 66 selects one or more VTOL rotors 18 from the plurality of VTOL rotors 18 on the right side. The command value generation unit 66 generates thrust command values for the selected VTOL rotors 18 in the same manner as the process of step S4.

In step S8, the attitude determiner 60 determines whether the attitude of the fuselage 12 is stabilized. This determination is periodically performed during the execution of step S6 and step S7. When the attitude of the fuselage 12 is stabilized (step S8: YES), the process is ended. After the process is ended, the VTOL rotor controller 56 controls the plurality of VTOL rotors 18 other than the failed rotor 18 in a cooperative manner to stabilize the attitude of the fuselage 12. On the other hand, when the attitude of the fuselage 12 is not stabilized (step S8: NO), the process of step S6 and the process of step S7 are continuously performed.

Specific Example 1

Figure 6:
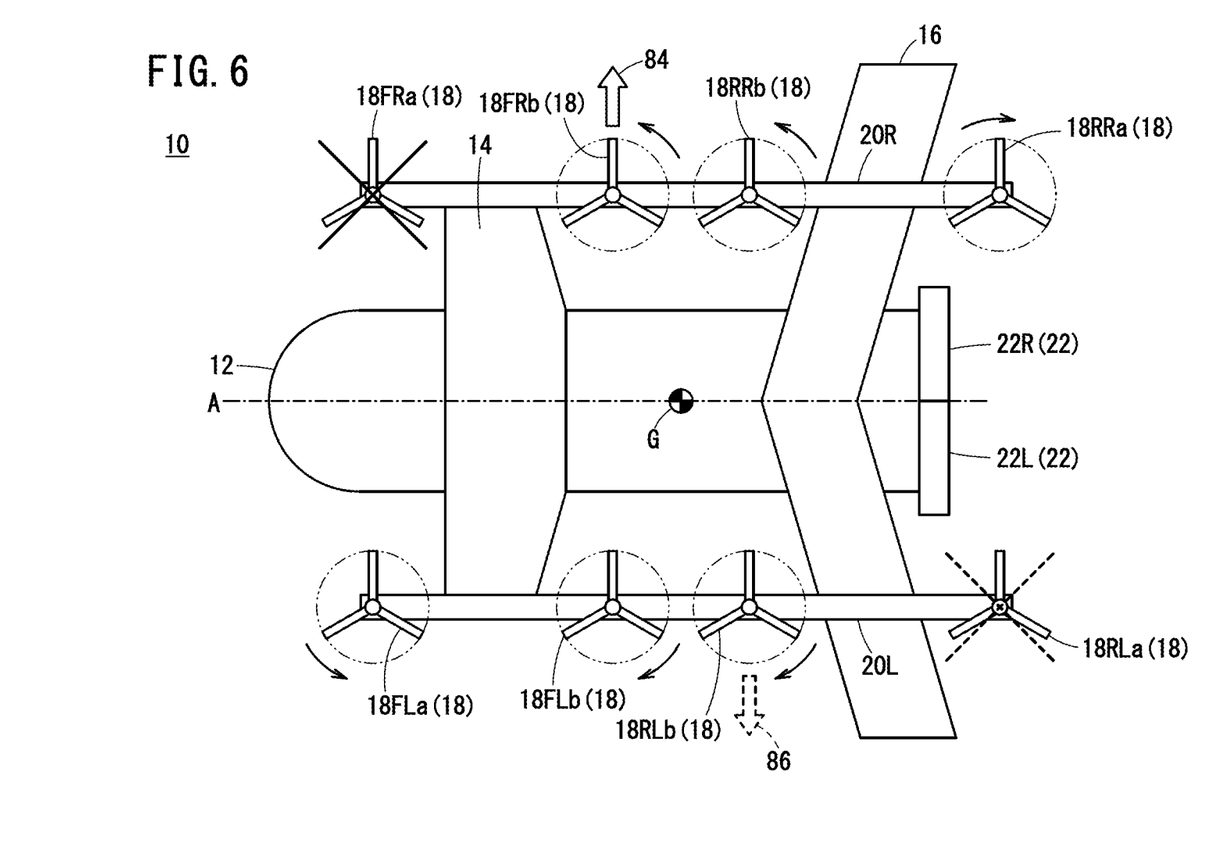
FIG. 6 is a schematic view of the aircraft in which a failure has occurred.
Figure 7:
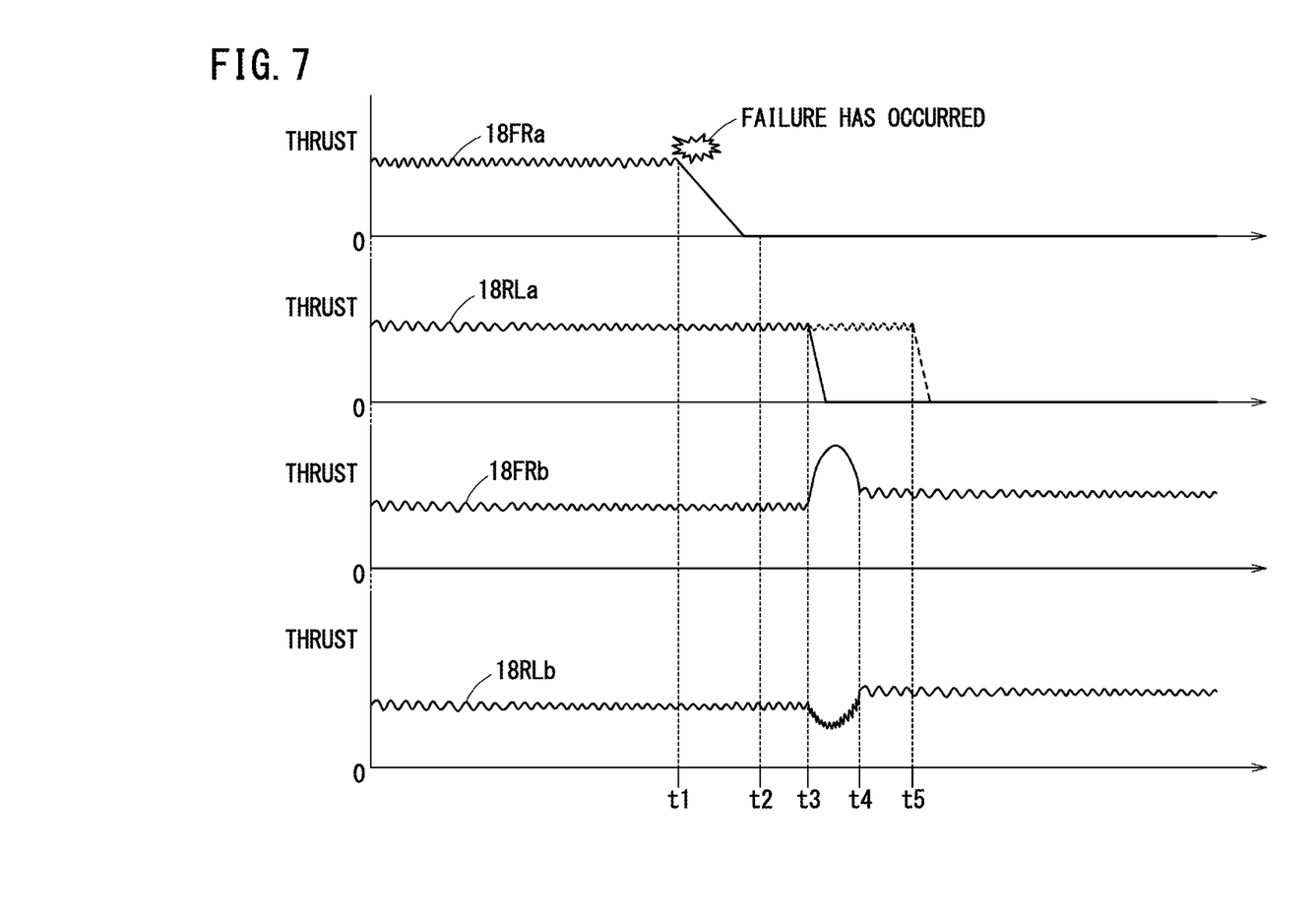
FIG. 7 shows time charts of the thrust of four VTOL rotors.

FIG. 6 is a schematic view of the aircraft 10 in which a failure has occurred. FIG. 7 shows time charts of the thrust of four VTOL rotors 18. The process shown in FIG. 5 will be described below by taking a case where the rotor 18FRa fails as an example.

In FIG. 6, the VTOL rotor 18 marked with a solid line "x" is the VTOL rotor 18 in which a failure has occurred. In FIG. 6, the VTOL rotor 18 marked with a broken line "x" is the VTOL rotor 18 to be stopped by control. In FIG. 6, the VTOL rotor 18 marked with a solid line arrow 84 is the VTOL rotor 18 whose thrust is temporarily increased. In FIG. 6, the VTOL rotor 18 marked with a broken line arrow 86 is the VTOL rotor 18 whose thrust is temporarily reduced.

As shown in FIG. 7, when a failure occurs in the rotor 18FRa at a time point t1, the thrust generated by the rotor 18FRa decreases and reaches zero. At a time point t2, the failure determination unit 62 determines that a failure has occurred in the rotor 18FRa. The time point t2 is a time point elapsed from the time point t1 by the detection delay time of the sensor.

After the failure determination, the VTOL rotor controller 56 executes the process of step S3 shown in FIG. 5 on the rotor 18FRb adjacent to the rotor 18FRa. Specifically, the VTOL rotor controller 56 increases the thrust generated by the rotor 18FRb without making the rotor 18FRb cause the thrust variation for the vibration suppression control. Then, as shown in FIG. 7, the thrust generated by the rotor 18FRb starts to increase at a time point t3. The time point t3 is a time point delayed from the time point t2 by a response delay time of the machine or the like. When the attitude of the fuselage 12 is stabilized at a time point t4, the VTOL rotor controller 56 returns the thrust control for the rotor 18FRb to the normal control. After the time point t4, the VTOL rotor controller 56 makes the rotor 18FRb cause the thrust variation for the vibration suppression control. The thrust generated by the rotor 18FRb after the time point t4 becomes larger than the thrust before the time point t1 and smaller than the thrust from the time point t3 to the time point t4.

After the failure determination, the VTOL rotor controller 56 executes the process of step S4 shown in FIG. 5 on the rotor 18RLb disposed at a position symmetrical to the position of the rotor 18FRb with respect to the center of gravity G. That is, the VTOL rotor controller 56 causes the rotor 18RLb to bear the burden of the thrust variation for the vibration suppression control that has been borne by the rotor 18FRb. Further, the VTOL rotor controller 56 temporarily reduces the thrust generated by the rotor 18RLb so as to be smaller than the thrust generated by the rotor 18RLb before the time point t2. Then, as shown in FIG. 7, the thrust generated by the rotor 18RLb temporarily decreases at the time point t3. The thrust variation component for the vibration suppression control that has been assigned to the rotor 18FRb is assigned to the thrust of the rotor 18RLb. When the attitude of the fuselage 12 is stabilized at the time point t4, the VTOL rotor controller 56 returns the thrust control for the rotor 18RLb to the normal control. The thrust generated by the rotor 18RLb after the time point t4 becomes larger than the thrust before the time point t1 and larger than the thrust from the time point t3 to the time point t4.

As shown in FIGS. 6 and 7, the VTOL rotor controller 56 may stop the rotor 18RLa (a symmetrically positioned second rotor) disposed at a position symmetrical to the position of the failed rotor 18FRa with respect to the center of gravity G. The VTOL rotor controller 56 stops the rotor 18RLa after the failure determination. Then, as shown in FIG. 7, at the time point t3, the thrust generated by the rotor 18RLa decreases and reaches zero.

As shown in FIG. 7, the VTOL rotor controller 56 may stop the rotor 18RLa at a time point t5 after the time point t4. In this case, the VTOL rotor controller 56 stops the rotor 18RLa after the process of step S3 and the process of step S4 shown in FIG. 5 are ended.

Specific Example 2

Figure 8:
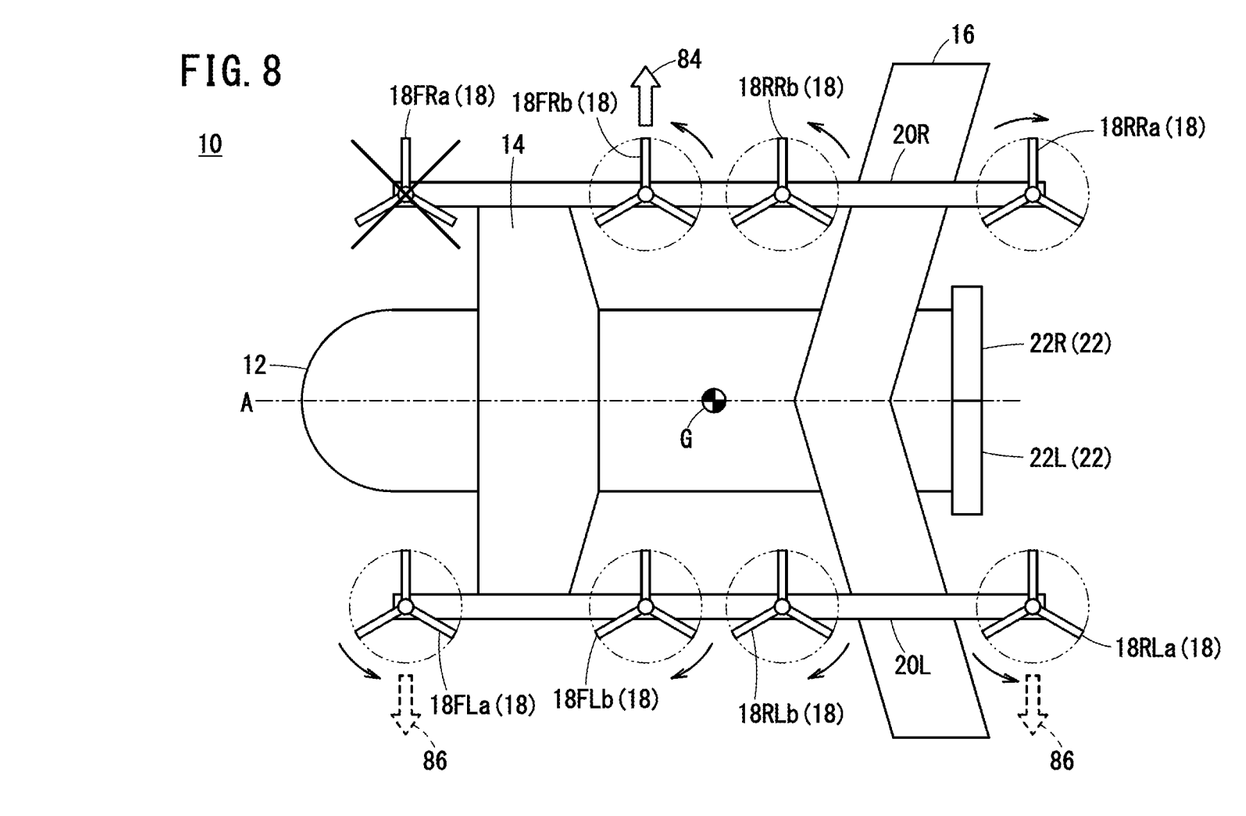
FIG. 8 is a schematic view of the aircraft in which a failure has occurred.

FIG. 8 is a schematic view of the aircraft 10 in which a failure has occurred. In FIG. 8, the VTOL rotor 18 marked with a solid line "x" is the VTOL rotor 18 in which a failure has occurred. In FIG. 8, the VTOL rotor 18 marked with a solid line arrow 84 is the VTOL rotor 18 whose thrust is temporarily increased. In FIG. 8, the VTOL rotors 18 marked with broken line arrows 86 are the VTOL rotors 18 whose thrust is temporarily reduced.

As shown in FIG. 8, when the rotor 18FRa fails, the VTOL rotor controller 56 increases the thrust generated by the rotor 18FRb without making the rotor 18FRb cause the thrust variation for the vibration suppression control. In this case, the VTOL rotor controller 56 may execute the process of step S4 shown in FIG. 5 on one or more VTOL rotors 18 on the left side. In the example shown in FIG. 8, the rotor 18RLa and the rotor 18FLa are subjected to the control process of step S4 shown in FIG. 5. Further, the VTOL rotor controller 56 may not stop the VTOL rotor 18 on the left side.

[Others]

In the above description, the case where the plurality of VTOL rotors 18 are grouped based on the center line A extending in the longitudinal direction of the fuselage 12 has been described as an example, but the present invention is not limited thereto. The plurality of VTOL rotors 18 may be grouped based on an imaginary line extending in the width direction of the fuselage 12. In this case, a plurality of VTOL rotors 18 (first rotors) disposed on one side (for example, the front side) of the imaginary line may be grouped into one group, and a plurality of VTOL rotors 18 (second rotors) disposed on the other side (for example, the rear side) of the imaginary line may be grouped into another group.

APPENDICES

The following notes (appendices) are further disclosed in relation to the above-described embodiment.

Appendix 1

A first disclosure is the control device (50) that controls the aircraft (10) including the plurality of rotors (18) configured to generate vertical thrust, wherein the plurality of rotors include the plurality of first rotors disposed on one side of the imaginary line (A) extending in the longitudinal direction of the fuselage (12) or the width direction of the fuselage, and the plurality of second rotors disposed on another side of the imaginary line, and the control device includes the rotor controller (56) configured to control the thrust generated by each of the plurality of rotors, and wherein the rotor controller is configured to execute the vibration suppression control for suppressing vibration of the aircraft by making one or more of the rotors cause the thrust variation for varying the thrust at a frequency equal to or higher than the predetermined frequency, and when any one of the plurality of first rotors fails, the rotor controller executes the thrust increase control for increasing the thrust generated by the adjacent first rotor (18) that is one of the first rotors and is adjacent to the failed first rotor, without making the adjacent first rotor cause the thrust variation for the vibration suppression control, and executes the vibration suppression control in a manner so that one or more of the second rotors bear the burden of the thrust variation that has been borne by the adjacent first rotor.

According to the above configuration, when any one of the first rotors fails, the thrust generated by the adjacent first rotor is increased, and therefore, the attitude of the fuselage can be quickly stabilized.

It should be noted that, if the vibration suppression control for varying the thrust at the predetermined frequency or higher is executed on the adjacent first rotor that generates large thrust, the power consumption of the electric motor that operates the adjacent first rotor further increases. According to the above configuration, the adjacent first rotor does not cause the thrust variation for the vibration suppression control, and therefore, it is possible to suppress an increase in the power consumption of the electric motor that operates the adjacent first rotor.

In order to simultaneously perform the thrust increase control and the vibration suppression control, an electric motor capable of providing a large output is required. That is, a large electric motor is required. In contrast, according to the above configuration, the thrust increase control and the vibration suppression control are not performed at the same time. Therefore, according to the above configuration, it is possible to suppress an increase in the size of the adjacent first rotor. In other words, according to the above configuration, all the rotors can be reduced in size and weight. As a result, according to the above configuration, it is possible to improve the power consumption.

Appendix 2

In the control device according to Appendix 1, the rotor controller may perform the vibration suppression control by varying the pitch of the plurality of blades provided in each of the rotors.

Appendix 3

In the control device according to Appendix 1 or 2, the rotor controller may cause one of the second rotors that is disposed at a position symmetrical to the position of the adjacent first rotor with respect to the center of gravity (G) of the aircraft, to bear the burden of the thrust variation that has been borne by the adjacent first rotor.

Appendix 4

In the control device according to any one of Appendices 1 to 3, simultaneously with execution of the thrust increase control for increasing the thrust generated by the adjacent first rotor, the rotor controller may reduce the thrust generated by the one or more second rotors bearing the burden of the thrust variation that has been borne by the adjacent first rotor.

Appendix 5

In the control device according to Appendix 1 or 2, the rotor controller may stop operation of a symmetrically positioned second rotor that is one of the second rotors and is disposed at a position symmetrical to the position of the failed first rotor with respect to the center of gravity of the aircraft, and before stopping the operation of the symmetrically positioned second rotor, the rotor controller may perform the thrust increase control for increasing the thrust generated by the adjacent first rotor and also execute the vibration suppression control in a manner so that the one or more second rotors bear the burden of the thrust variation that has been borne by the adjacent first rotor.

Appendix 6

The aircraft includes the control device according to any one of Appendices 1 to 5.

Appendix 7

A second disclosure is the control method for controlling the aircraft including the plurality of rotors configured to generate vertical thrust, wherein the plurality of rotors include the plurality of first rotors disposed on one side of the imaginary line extending in the longitudinal direction of the fuselage or the width direction of the fuselage, and the plurality of second rotors disposed on another side of the imaginary line, and the control method includes the control step in which the rotor controller controls the thrust generated by each of the plurality of rotors, and wherein, in the control step, the vibration suppression control for suppressing vibration of the aircraft is executable by making one or more of the rotors cause the thrust variation for varying the thrust at a frequency equal to or higher than the predetermined frequency, and in the control step, when any one of the plurality of first rotors fails, the thrust increase control for increasing the thrust generated by the adjacent first rotor that is one of the first rotors and is adjacent to the failed first rotor is executed without making the adjacent first rotor cause the thrust variation for the vibration suppression control, and the vibration suppression control is executed in a manner so that one or more of the second rotors bear the burden of the thrust variation that has been borne by the adjacent first rotor.

The present invention is not limited to the above disclosure, and various modifications are possible without departing from the essence and gist of the present invention.

The invention claimed is:

1. A control device that controls an aircraft including a plurality of rotors configured to generate vertical thrust, the control device comprising one or more processors that execute computer-executable instructions stored in a memory,
wherein the one or more processors execute the computer-executable instructions to cause the control device to:
control the thrust of each of a plurality of first rotors and the thrust of each of a plurality of second rotors, the first rotors being disposed on one side of an imaginary line extending in a longitudinal direction of a fuselage or a width direction of the fuselage, and the second rotors being disposed on another side of the imaginary line;
execute vibration suppression control for suppressing vibration of the aircraft by making one or more of the rotors cause thrust variation for varying the thrust at a frequency equal to or higher than a predetermined frequency; and
when any one of the plurality of first rotors fails, execute thrust increase control for increasing the thrust generated by an adjacent first rotor that is one of the first rotors and is adjacent to the first rotor that has failed, without making the adjacent first rotor cause the thrust variation for the vibration suppression control, and execute the vibration suppression control in a manner so that one or more of the second rotors bear a burden of the thrust variation that has been borne by the adjacent first rotor.

2. The control device according to claim 1, wherein
the one or more processors cause the control device to perform the vibration suppression control by varying a pitch of a plurality of blades provided in each of the rotors.

3. The control device according to claim 1, wherein
the one or more processors cause the control device to cause one of the second rotors that is disposed at a position symmetrical to a position of the adjacent first rotor with respect to a center of gravity of the aircraft, to bear the burden of the thrust variation that has been borne by the adjacent first rotor.

4. The control device according to claim 1, wherein
the one or more processors cause the control device to, simultaneously with execution of the thrust increase control for increasing the thrust generated by the adjacent first rotor, reduce the thrust generated by the one or more second rotors bearing the burden of the thrust variation that has been borne by the adjacent first rotor.

5. The control device according to claim 1, wherein
the one or more processors cause the control device to:
stop operation of a symmetrically positioned second rotor that is one of the second rotors and is disposed at a position symmetrical to a position of the first rotor that has failed with respect to a center of gravity of the aircraft; and
before stopping the operation of the symmetrically positioned second rotor, perform the thrust increase control for increasing the thrust generated by the adjacent first rotor, and also execute the vibration suppression control in a manner so that the one or more second rotors bear the burden of the thrust variation that has been borne by the adjacent first rotor.

6. An aircraft comprising a plurality of rotors and a control device, said plurality of rotors being configured to generate vertical thrust, the control device controlling the aircraft and comprising one or more processors that execute computer-executable instructions stored in a memory,
wherein the one or more processors execute the computer-executable instructions to cause the control device to:
control the thrust of each of a plurality of first rotors and the thrust of each of a plurality of second rotors, the first rotors being disposed on one side of an imaginary line extending in a longitudinal direction of a fuselage or a width direction of the fuselage, and the second rotors being disposed on another side of the imaginary line;
execute vibration suppression control for suppressing vibration of the aircraft by making one or more of the rotors cause thrust variation for varying the thrust at a frequency equal to or higher than a predetermined frequency; and
when any one of the plurality of first rotors fails, execute thrust increase control for increasing the thrust generated by an adjacent first rotor that is one of the first rotors and is adjacent to the first rotor that has failed, without making the adjacent first rotor cause the thrust variation for the vibration suppression control, and execute the vibration suppression control in a manner so that one or more of the second rotors bear a burden of the thrust variation that has been borne by the adjacent first rotor.

7. A control method for controlling an aircraft including a plurality of rotors configured to generate vertical thrust,
the control method comprising controlling the thrust of each of a plurality of first rotors and the thrust of each of a plurality of second rotors, the first rotors being disposed on one side of an imaginary line extending in a longitudinal direction of a fuselage or a width direction of the fuselage, and the second rotors being disposed on another side of the imaginary line,
wherein, in the controlling of the thrust, vibration suppression control for suppressing vibration of the aircraft is executable by making one or more of the rotors cause thrust variation for varying the thrust at a frequency equal to or higher than a predetermined frequency, and
in the controlling of the thrust, when any one of the plurality of first rotors fails, thrust increase control for increasing the thrust generated by an adjacent first rotor that is one of the first rotors and is adjacent to the first rotor that has failed is executed without making the adjacent first rotor cause the thrust variation for the vibration suppression control, and the vibration suppression control is executed in a manner so that one or more of the second rotors bear a burden of the thrust variation that has been borne by the adjacent first rotor.

* * * * *